(12) United States Patent
Reichert et al.

(10) Patent No.: US 11,623,512 B2
(45) Date of Patent: Apr. 11, 2023

(54) ELECTROMECHANICAL DRIVE ARRANGEMENT FOR A MOTOR VEHICLE

(71) Applicant: Schaeffler Technologies AG & Co. KG, Herzogenaurach (DE)

(72) Inventors: Andrea Reichert, Emskirchen (DE); Martin Dressel, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 248 days.

(21) Appl. No.: 17/261,228

(22) PCT Filed: Aug. 7, 2019

(86) PCT No.: PCT/DE2019/100715
§ 371 (c)(1),
(2) Date: Jan. 19, 2021

(87) PCT Pub. No.: WO2020/030230
PCT Pub. Date: Feb. 13, 2020

(65) Prior Publication Data
US 2021/0268899 A1    Sep. 2, 2021

(30) Foreign Application Priority Data

Aug. 10, 2018    (DE) .................... 10 2018 119 485.4

(51) Int. Cl.
*B60K 17/12*    (2006.01)
*B60K 17/16*    (2006.01)
(Continued)

(52) U.S. Cl.
CPC .............. *B60K 17/12* (2013.01); *B60K 17/16* (2013.01); *B60K 17/22* (2013.01); *B60K 17/26* (2013.01); *B60K 2025/005* (2013.01)

(58) Field of Classification Search
CPC ........ B60K 17/12; B60K 17/16; B60K 17/22; B60K 17/26; B60K 2025/005
See application file for complete search history.

(56) References Cited

U.S. PATENT DOCUMENTS 8,632,438 B2 *   1/2014   Kuroda ..................... B60K 6/48
                                                        477/5
10,569,761 B2 *  2/2020   Ikushima ................. B60K 6/52
(Continued)

FOREIGN PATENT DOCUMENTS

DE       102012010171 A1    11/2013
FR       3043362 A1          5/2017
(Continued)

Primary Examiner — Tinh Dang

(57) ABSTRACT

An electromechanical drive arrangement for a motor vehicle includes an electromechanical main drive motor, a reduction transmission device which comprises a transmission input, a transmission output, at least one reduction stage and a transmission housing which accommodates the reduction stage, an axial differential transmission for splitting the drive power, which is guided by means of the reduction stage, between a first and a second wheel drive train section, and an auxiliary assembly which can be driven by the main drive motor by means of the reduction stage. The auxiliary assembly is arranged outside the transmission housing. A switching element is provided in the transmission housing such that the drive connection from the reduction stage to the axial differential transmission can be closed in a switchable manner and can be disconnected in a switchable manner.

18 Claims, 4 Drawing Sheets

(51) Int. Cl.
B60K 17/22 (2006.01)
B60K 25/00 (2006.01)
B60K 17/26 (2006.01)

(56) References Cited

U.S. PATENT DOCUMENTS

| | | | |
|---|---|---|---|
| 10,583,732 B2 * | 3/2020 | Iwano | ............ B60W 10/08 |
| 2012/0221197 A1 | 8/2012 | Hisada et al. | |
| 2012/0247269 A1 | 10/2012 | Horie | |

FOREIGN PATENT DOCUMENTS

| | | | | |
|---|---|---|---|---|
| JP | 2010178403 A | | 8/2010 | |
| JP | 2013150502 A | | 8/2013 | |
| JP | 2018-035971 | * | 3/2018 | ............ B60K 6/52 |
| WO | 2012117623 A1 | | 9/2012 | |
| WO | 2012132094 A1 | | 10/2012 | |
| WO | 2013170848 A1 | | 11/2013 | |

* cited by examiner

T1

|  | Electric motor drives | Electric motor is driven (generator operation) | Electric motor stopped |
|---|---|---|---|
| Veh. driving | 1 Drive | 2 Recuperation/ battery charging | 3 Cruising |
| Veh. stationary | 4 Stationary AC | - | 5 Stationary/parking |

T2

| | | Switching element | | |
|---|---|---|---|---|
| | | S1 | S2 | S3 |
| Operating state | 1 | Close | Open/close | Close/open |
| | 2 | Close | Open | Close |
| | 3 | Open | Open | Close |
| | 4 | Open | Close | Open |
| | 5 | Open/close | Open/close | Open/close |

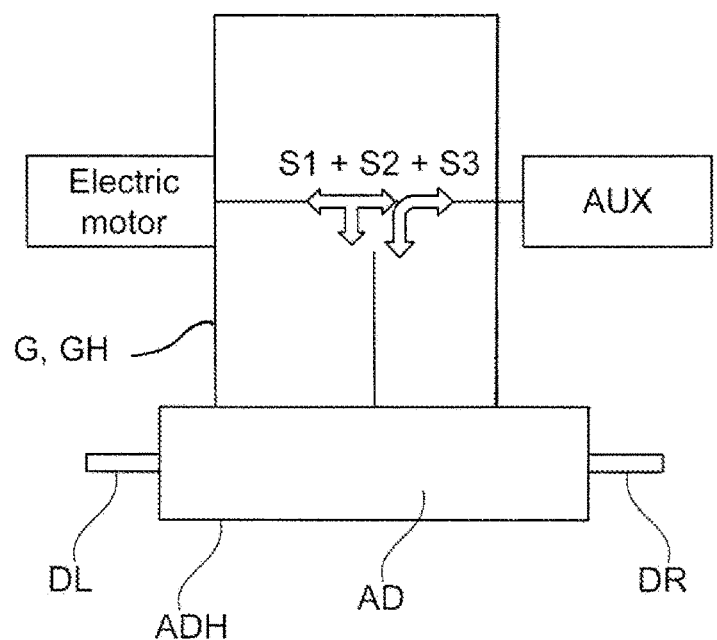

Fig. 4

ELECTROMECHANICAL DRIVE ARRANGEMENT FOR A MOTOR VEHICLE

CROSS-REFERENCE TO RELATED APPLICATIONS

This application is the U.S. National Phase of PCT Appln. No. PCT/DE2019/100715 filed Aug. 7, 2019, which claims priority to DE 10 2018 119 485.4 filed Aug. 10, 2018, the entire disclosures of which are incorporated by reference herein.

TECHNICAL FIELD

The disclosure relates to an electromechanical drive arrangement for a motor vehicle, having an electromechanical main drive motor, provided for driving the motor vehicle and comprising a rotor and a stator, a reduction gear device, kinematically coupled to the rotor, an axle differential for branching the drive power present at the output of the reduction gear device to a first and a second wheel drive train portion, and at least one auxiliary unit, e.g., in the form of a power steering pump, an air conditioning compressor, or a pump for a coolant circuit routed across a battery assembly, which auxiliary unit is drivable via the main drive motor.

BACKGROUND

An electromechanical drive arrangement of the type mentioned above is known from DE 10 2012 010 171 A1. In this known drive arrangement, the main drive motor is composed of two coaxially joined sub-engines, the outputs of which are routed to two separate inputs of a planetary gear. The auxiliary unit provided in this drive arrangement is arranged coaxially to the axis of the inner sub-engine and is kinematically coupled to its rotor.

SUMMARY

It is desirable to create an electromechanical drive arrangement for an all-electrically operated motor vehicle, which is characterized by an advantageously implementable overall construction and which can be operated advantageously from an energetic point of view.

An electromechanical drive arrangement for a motor vehicle includes:

an electromechanical main drive motor, comprising a rotor and a stator, a reduction gear device, comprising a transmission input, a transmission output, at least one reduction stage, and a transmission housing, accommodating the reduction stage, an axle differential for branching the drive power routed via the reduction stage to a first and a second wheel drive train portion, and an auxiliary unit that is drivable by the main drive motor via the reduction stage, wherein the auxiliary unit is arranged outside the transmission housing, a switching element is provided in the transmission housing, and the switching element is designed and integrated into the drive arrangement such that the drive connection from the reduction stage to the axle differential is switchably closable and switchably separable.

This advantageously makes it possible to create a drive arrangement for a purely electromechanically operated motor vehicle in which the auxiliary unit is drivable via the reduction gear when the vehicle is stationary.

The integration of the switching element and the auxiliary unit into the drive arrangement is accomplished such that, when the drive connection between the axle differential and the reduction stage is removed and the motor vehicle is operated in overrun mode, the auxiliary unit is drivable by the axle differential. This makes it possible in an advantageous manner to achieve a direct mechanical drive of the auxiliary unit without energy conversion.

Furthermore, the transmission integration of the switching element and the auxiliary unit in the drive arrangement is also accomplished in that the integration of the switching element and the auxiliary unit into the drive arrangement is accomplished such that, when the drive connection between the axle differential and the reduction stage is removed and the motor vehicle is stationary, the auxiliary unit is drivable by the main drive motor via the reduction stage.

The reduction stage is preferably constructed such that it comprises an intermediate shaft. This intermediate shaft is preferably arranged to be offset parallel to the rotor axis of the electric motor. The reduction stage is furthermore preferably constructed such that it has a first gearwheel and a second gearwheel engaging therein, wherein the second gearwheel is arranged on the intermediate shaft and has a number of teeth which is greater than the number of teeth of the first gearwheel. The reduction stage brings about a "slowing" transmission ratio, i.e., a speed reduction and an increase in torque. The auxiliary unit located outside the transmission housing uses the transmission ratio effect of the reduction stage, especially if it is driven by the electric motor when the vehicle is stationary and the auxiliary unit requires power and the drive train of the reduction stage is otherwise separated from the axle differential by setting a corresponding switching state of the switching element.

The switching element is preferably integrated into the drive arrangement in the inner region of the transmission housing such that it switchably couples the intermediate shaft to the second gearwheel. Alternatively, or in combination with this measure, the switching element in the interior of the transmission housing can also be designed and integrated into the drive arrangement such that it switchably couples the intermediate shaft to an output gear seated thereon.

The auxiliary unit located outside of the transmission housing can be designed such that it has an input shaft and is preferably arranged such that this input shaft extends coaxially with the intermediate shaft. Alternatively, the external auxiliary unit can also be integrated into the drive arrangement such that its input shaft is offset parallel to the intermediate shaft. The transmission coupling of the auxiliary unit with the reduction stage is then preferably accomplished with the inclusion of a traction mechanism drive running outside the transmission housing which, if necessary, makes a further transmission contribution itself.

The drive arrangement can also comprise several, in particular two auxiliary units, located outside the transmission housing, wherein the first auxiliary unit preferably has an input shaft which is arranged coaxially to the axis of the intermediate shaft, and that the second auxiliary unit has a second input shaft which is arranged to be offset parallel to the axis of the intermediate shaft. The auxiliary units are preferably integrated into the drive arrangement such that their input shafts face the reduction stage. The reduction stage is then preferably located axially between the main drive electric motor and the external auxiliary units.

The switching element is preferably designed and integrated into the drive arrangement such that it can be brought into a state in which the drive connection between the reduction stage and the axle differential is removed and the auxiliary unit is driven via the axle differential in vehicle overrun mode. For this purpose, a positive or frictionally engaged coupling device and/or a freewheel device can be provided in the switching element.

An electronic control device may be provided, wherein the switching state of the switching element is set via this control device, wherein the control device takes into account the current operating state of the vehicle and sets the switching state in accordance with a control concept that takes into account overall energy efficiency. The control device can take into account the current or a modeled thermal state of the battery system, the heat energy requirement for heating the vehicle interior, the cooling power requirement, as well as the energy requirement of the auxiliary unit and, based on this input information, then cause switching states that have the effect that, for example, energy from it is used in overrun mode of the vehicle as efficiently as possible and without conversion losses in order to cover the energy requirements of the auxiliary unit. The control device can take into account the speeds at which the unit would be driven if the switching element were engaged and, for example, initially perform energy recuperation in parallel to the operation of the auxiliary unit via the main drive motor, which is temporarily operated as a generator, and then use the tappable power primarily for the drive of the auxiliary unit only at slower deceleration speeds of the vehicle. Mixed states can also be temporarily set in which both a direct mechanical drive of the auxiliary units from the thrust power and also recuperation via the electric motor are carried out in overrun mode. The control device can in particular be designed and configured such that, when the auxiliary unit requires power, it is primarily covered by power tapping from the axle differential when the vehicle is in overrun mode.

The auxiliary unit arranged outside the transmission housing is preferably designed such that this auxiliary unit has an input shaft and this input shaft is arranged coaxially with the intermediate shaft of the reduction stage. The auxiliary unit can be attached directly to the transmission housing, it can also be connected to the transmission housing via a linkage, strut, or some other holding arrangement.

The drive arrangement can also be designed such that the input shaft of the auxiliary unit is arranged to be offset parallel to the intermediate shaft of the reduction stage. The power transfer can then be accomplished by a drive train portion extending outside the transmission housing or also inside thereof, in particular in the form of a belt drive. The drive arrangement can also be designed such that it comprises two auxiliary units and herein one of the auxiliary units is arranged with its input shaft coaxial to the intermediate shaft of the reduction stage and the second auxiliary unit is offset parallel to this axis of rotation.

The switching element is preferably formed to be multifunctional such that a drive connection to the axle differential can be established and removed via it, and the two further coupling functions, i.e., selective coupling of the electric motor with the auxiliary unit and selective coupling of the axle differential with the auxiliary unit, are provided by it. The switching element is preferably arranged between the intermediate shaft and the axle differential, in particular integrated into a gearwheel of the reduction stage.

The reduction stage can be designed as a spur gear stage, having a spur gear which is arranged coaxially to the rotor axis, wherein the power transfer to the intermediate shaft is then in turn preferably accomplished by the second spur gear.

The reduction stage can also be designed as a planetary gear and in turn be designed such that it switchably offers at least two different transmission ratios.

As already mentioned above, it is possible to achieve the kinematic coupling of the external auxiliary unit with the reduction stage via a belt drive extending outside the transmission housing, wherein this belt drive can be designed in particular as a toothed belt, as a flat or V-belt, or in particular as a poly-V belt.

The drive arrangement can also be designed such that it comprises a freewheel device and that this freewheel device allows the input shaft of the auxiliary unit to be driven by the energy that can be tapped from the axle differential when the vehicle is in overrun mode and then rotates at a higher speed than the second gear of the reduction stage, i.e., that sitting on the intermediate shaft.

The switching element is preferably designed as a form-fitting and/or frictionally coupling switching element. The switching element can also be designed as a transmission device, the switching state of which can be set by affixing/releasing a transmission element, for example a ring gear.

The reduction gear device can also be designed as a multi-stage switchable gear device. The drive arrangement is an all-electric drive arrangement in which the main drive power is provided by the electric motor. The drive arrangement does not comprise an internal combustion engine. The electric motor can advantageously be manufactured as an initially independent assembly and then connected to the transmission housing as part of the assembly of the drive arrangement. It is also possible to provide at least part of the motor housing, in particular in the form of a barrel housing portion, through the transmission housing.

The axle differential can be constructed such that it comprises its own differential transmission housing, which is then connected directly to the housing of the reduction gear device. It is also possible to still accommodate the axle differential in the transmission housing, or to manufacture the axle differential transmission housing integrally with the housing of the reduction gear. The motor housing can also form an integral part of the transmission housing, i.e., be integrally implemented therewith.

Units, such as water pump, air conditioning compressor, and power steering pump, may be operated in an energetically advantageous manner when the vehicle is stationary and when it is in overrun mode. A new type of connection to the external auxiliary units is proposed. It consists in the connection of the auxiliary units to the transmission in connection with "intelligent" switching elements, which make it possible to always operate the auxiliary units in the most energy-efficient mode, depending on the operating state of the vehicle and/or the drive motor(s) and/or the battery charge state and/or external factors (e.g., the temperature). This is ensured by the auxiliary units being driven via the transmission shaft when the vehicle is moving. In particular, the kinetic energy of the vehicle can also be used. In addition, the mechanical drive offers significant advantages in the overall efficiency chain, compared to purely electrified units. When the vehicle is stationary, the drive is electrical via a direct connection to the electric motor. The connection between the external units and the transmission shaft is released, reducing friction losses. This mode of operation enables the provision of comfort functions, such as stationary air conditioning when the vehicle is stationary, or the safeguarding of necessary functions, such as operating the battery cooling circuit via a water pump for aftercooling after the vehicle has been stationary.

The arrangement enables the energy consumption by auxiliary units in all-electric vehicles to be reduced and results in an increase in the vehicle range.

A drive train of an electric vehicle includes an electric main engine, with a transmission, and with at least one auxiliary unit. According to the illustrations explained in more detail below, the transmission may only contain the final drive and the differential. Alternatively, however, the drive arrangement can also have further transmission stages. The at least one auxiliary unit is arranged outside the housing of the drive unit or the transmission. The electric main engine and the transmission are connected to one another via an intermediate shaft. The intermediate shaft drives the auxiliary unit or units. A switching element located in the transmission housing is arranged in the power flow between the electrical machine, the auxiliary unit, and the transmission and is assigned to the intermediate shaft.

The external auxiliary units can be arranged to be coaxial or axially parallel to the intermediate shaft of the reduction stage. In the case of an axially parallel arrangement, a transmission connection between the intermediate shaft and the auxiliary unit is formed, preferably formed by an epicyclic transmission. The drive arrangement can advantageously be constructed such that it also enables an optional drive of two auxiliary units, which are preferably arranged to be axially parallel to one another and coupled via an operative transmission connection.

At least one auxiliary unit arranged outside the transmission housing is coupled to the electric drive machine via a switching element. At least two, preferably three "paths" can be switched by means of this switching element. Only the axle differential is supplied with power via the first path. The power from the electric motor flows via the reduction stage to the auxiliary unit via a second path (when the vehicle is stationary). Power flows from the differential to the auxiliary unit via the third path (drive via the transmission shaft in vehicle overrun mode).

The axes of the intermediate shaft and the auxiliary unit can be arranged coaxially to one another or axially parallel. In the case of the axially parallel arrangement, there is a transmission connection between the reduction stage and the rotor axis of the auxiliary unit. A second or further auxiliary unit is optionally arranged coaxially or axially parallel to one another and connected to one another via a further transmission stage. Auxiliary units arranged to be axially parallel to one another can, for example, be connected to one another by means of a traction mechanism drive.

BRIEF DESCRIPTION OF THE DRAWINGS

Further details and features will become apparent from the following description in conjunction with the drawing. In the figures:

FIG. 4 shows a fourth schematic representation to illustrate the mode of operation and the switching states of the drive arrangement in different vehicle operating states.

DETAILED DESCRIPTION

Figure 1:
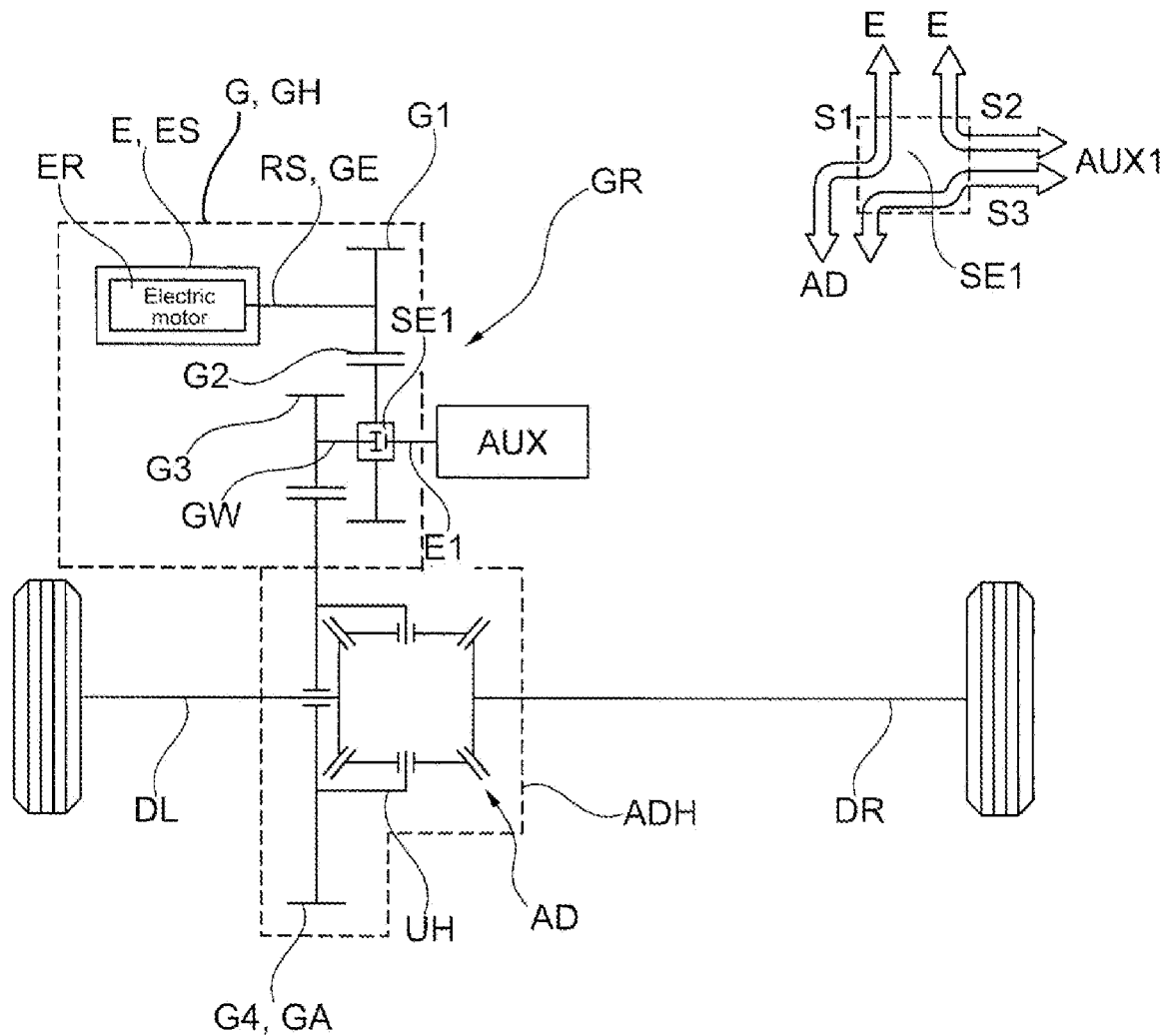
FIG. 1 shows a first schematic representation to illustrate the structure of an electromechanical drive arrangement, having an auxiliary unit arranged outside the transmission housing and coaxially arranged with the intermediate shaft of the reduction gear, as well as a switching element integrated into the transmission for the selective coupling of the external auxiliary unit with the reduction stage and preferably also the drive train portion leading to the axle differential.

The illustration according to FIG. 1 shows an electromechanical drive arrangement, having an electromechanical main drive motor E, comprising a rotor ER and a stator ES, a reduction gear device G, comprising a gear input GE, a gear output GA, at least one reduction stage GR, and a transmission housing GH, which accommodates the reduction stage GR, an axle differential AD for branching the drive power present at the output of the reduction gear device GR to a first and a second wheel drive train portion DL, DR, and an auxiliary unit AUX that is drivable by the main drive motor E. The auxiliary unit AUX can in particular be an air conditioning compressor, a power steering pump, a delivery module of a brake system, or a cooling water pump for cooling a battery assembly and for circulating a fluid for heating the vehicle interior of a corresponding motor vehicle.

The auxiliary unit AUX is arranged outside the transmission housing GH and integrated into the drive arrangement such that it is drivable by the main drive motor E via the reduction stage GR. A switching element SE1 is provided in the transmission housing GH. This switching element SE1 is designed and integrated into the drive arrangement such that the drive connection from the reduction stage GR to the axle differential AD is switchably closable and switchably separable. (Coupling function S1 in FIG. 4).

The integration of the switching element SE1 and the auxiliary unit AUX into the drive arrangement is accomplished such that, when the drive connection between the axle differential AD and the reduction stage GR is removed and the motor vehicle is operated in overrun mode, the auxiliary unit is drivable by the axle differential. (Coupling function S3 in FIG. 4)

In addition, the integration of the switching element SE1 and the auxiliary unit AUX into the drive arrangement is accomplished such that, when the drive connection between the axle differential AD and the reduction stage GR is removed and the motor vehicle is stationary, the auxiliary unit AUX is drivable by the main drive motor E via the reduction stage GR. (Coupling function S2 in FIG. 4)

The reduction stage GR comprises an intermediate shaft GW as well as a first gearwheel G1 and a second gearwheel G2 engaging therewith. The second gearwheel G2 is arranged on the intermediate shaft GW and has a number of teeth that is greater than the number of teeth of the first gearwheel G1 so that the reduction stage GR brings about a reduction in speed.

The switching element SE1 is designed here such that it switchably couples the intermediate shaft GW with the second gearwheel G2. Alternatively, it is also possible to design the switching element SE1 such that it switchably couples the intermediate shaft GW with an output gearwheel G3 seated thereon. Said output gearwheel G3 of the intermediate shaft GW engages radially from the outside into a large gear G4, which here is directly and torsionally rigidly coupled to the epicyclic housing UH of the axle differential AD.

The auxiliary unit AUX located outside the transmission housing GH has an input shaft E1 and this input shaft E1 is arranged coaxially to the axis of the intermediate shaft GW.

The drive arrangement is characterized in that the auxiliary unit AUX is arranged outside the transmission housing GH and, furthermore, a switching element SE is provided in the transmission housing GH, wherein the switching element SE is designed and integrated into the drive arrangement such that the drive connection between the rotor ER and the axle differential AD is switchably closable and separable and the auxiliary unit AUX is selectively drivable via the rotor ER when the drive connection between the rotor ER and the axle differential AD is removed.

In the drive arrangement, the auxiliary unit AUX has an input shaft E1 and this input shaft E1 is arranged coaxially to the rotational axis X of the rotor ER of the electric motor E. The switching element SE1 is also arranged coaxially to the axis of the intermediate shaft and switches its output torque to an output of the switching element or causes a decoupling.

The switching element SE1 is designed such that a drive connection to the axle differential AD can be established therewith. The switching element SE1 is integrated directly into the reduction stage GR in this exemplary embodiment. The reduction stage GR here is designed as a spur gear stage and the switching element SE1 enables a first spur gear G1, which is small in terms of its diameter, to be coupled to the rotor shaft RS. For this purpose, the switching element SE1 is designed as a form-fitting or frictionally coupling switching element SE1. The actuators provided for setting the respective switching state are not shown here; they can be integrated into the switching element and, in particular, be designed as electromagnetic or fluid-mechanical actuators.

The electric motor E and the reduction gear G are integrated into a common housing device GH. The axle differential AD is connected to this housing device GH or is also integrated. The axle differential is housed in a differential housing ADH. It can be formed integrally with the transmission housing GH or attached thereto.

In the drive arrangement, the transmission G is connected to at least one electric drive motor E on the input side, and to at least one vehicle axle DL, DR on the output side. The transmission G comprises one or more shafts in which a planetary gear set can be integrated or which are connected to one another by means of spur gear stages or planetary gear sets. The auxiliary unit AUX, such as an air conditioning compressor, a water pump or the like, is connected to the intermediate shaft GW of the reduction gear GR coaxially thereto.

The illustration according to FIG. 2 again shows an electromechanical drive arrangement, having an electromechanical main drive motor E, comprising a rotor ER and a stator ES, a reduction gear device G, comprising a gear input GE, a gear output GA, at least one reduction stage GR, and a transmission housing GH, which accommodates the reduction stage GR, an axle differential AD for branching the drive power present at the output of the reduction gear device to a first and a second wheel drive train portion DL, DR, and an auxiliary unit AUX that is drivable by the main drive motor E.

This drive arrangement is also characterized in that the auxiliary unit AUX is arranged outside the transmission housing GH and a switching element SE1 is provided in the transmission housing GH, and the switching element SE1 is designed and integrated into the drive arrangement such that the drive connection between the reduction stage GR and the axle differential AD is switchably closable and separable, and the auxiliary unit AUX is also selectively drivable via the reduction stage GR when the drive connection between the reduction stage GR and the axle differential AD is removed.

In this variant, the auxiliary unit AUX is connected from the outside to the transmission housing such that the input shaft E1 of the auxiliary unit AUX is arranged to be offset parallel to the axis of the intermediate shaft GW. This is achieved here by a traction mechanism drive TM. It comprises a first traction mechanism wheel TM1 and a second traction mechanism wheel TM2 as well as a traction mechanism TM3 designed as a belt or chain. The first traction mechanism wheel TM1 is arranged coaxially to the axis of the intermediate shaft and can be switchably coupled to the intermediate shaft or the second spur wheel G2 of the reduction stage by means of the switching element SE1. The traction mechanism drive TM is located outside of the transmission housing GH.

The switching element SE1 is integrated into the reduction stage GR, in particular the second spur gear G2 thereof. The reduction stage GR comprises two spur gears G1, G2. The first spur gear G1 is driven by the rotor shaft RS of the electric motor and engages radially from the outside into the second spur gear G2 of the reduction stage GR. The further transfer of power from the reduction stage GR is accomplished by means of a third spur gear G3 that sits on the intermediate shaft. This third spur gear G3 engages into a fourth spur gear G4, which forms the large wheel or crown wheel of the axle differential AD and, for this purpose, is connected to the epicyclic housing UH or the web of the axle differential AD in a torsionally fixed manner. The switching element SE1 transfers power to the external auxiliary unit AUX. This transfer is switchable, i.e., closable and separable, by means of the switching element SE1.

Figure 3:
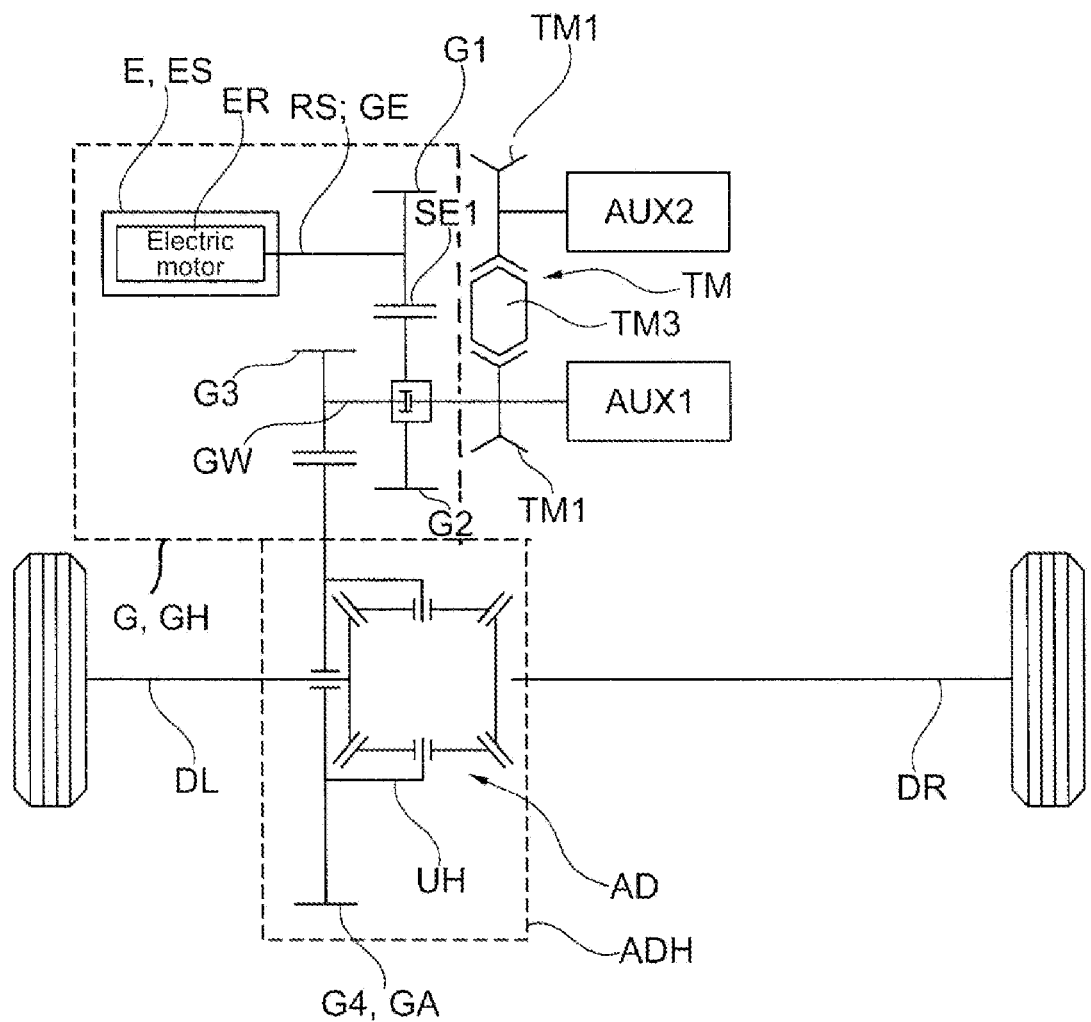
FIG. 3 shows a third schematic representation to illustrate the structure of an electromechanical drive arrangement, this time having two auxiliary units arranged outside the transmission housing, as well as a transmission-internal switching element provided for their selective coupling with the reduction stage and the drive train portion leading to the axle differential, wherein one of the auxiliary units here is arranged coaxially to the axis of the intermediate shaft and the further auxiliary unit is arranged to be offset axially parallel thereto.

The embodiment of FIG. 3 shows a third variant of an electromechanical drive arrangement, having an electromechanical main drive motor E, comprising a rotor ER and a stator ES, a reduction gear device G, comprising a gear input GE, a gear output GA, at least one reduction stage GR, and a transmission housing GH, which accommodates the reduction stage GR, an axle differential AD for branching the drive power present at the output of the reduction gear device to a first and a second wheel drive train portion DL, DR, and a first auxiliary unit AUX1 and a second auxiliary AUX2, which are each drivable by the main drive motor E via the reduction stage GR.

This drive arrangement is characterized in that both auxiliary units AUX1, AUX2 are arranged outside the transmission housing GH and a switching element SE1 is provided in the transmission housing GH, wherein the switching element SE1 is designed and integrated into the drive arrangement such that the drive connection between the second gearwheel G2 of the reduction stage and the axle differential AD is switchably closable and separable, and the external auxiliary units AUX1, AUX2 are still drivable by means of the reduction stage when the drive connection between the rotor ER and the axle differential AD is removed.

In this variant, the external auxiliary unit AUX1 has an input shaft E1 and this input shaft E1 is arranged coaxially to the axis of rotation of the intermediate shaft GW. The auxiliary unit AUX2 is integrated into the drive arrangement such that the input shaft E2 of the auxiliary unit AUX2 is arranged to be offset parallel to the axis of the intermediate shaft. This is achieved here in turn by a traction mechanism drive TM which is external with respect to the transmission housing GH. It comprises a first traction mechanism wheel TM1 and a second traction mechanism wheel TM2 as well as a traction mechanism TM3 designed as a belt or chain. The first traction mechanism wheel TM1 is arranged coaxially to the rotor axis X and can be switchably coupled to the rotor shaft or the first spur wheel G1 of the reduction stage by means of the switching element SE.

The switching element SE1 can be couplable or releasable either actively, e.g., as a magnetic clutch, as a multi-disc clutch, or passively, e.g., as a freewheel. At the same time, this one switching element SE1 enables the electric motor and the auxiliary unit to be decoupled, independently of one another or simultaneously, from the transmission and thus from the drive train of the vehicle. This functional integration reduces the number of components to a minimum.

The switching element SE1 can contain constant or variable transmission/reduction stages, such as a planetary gear set. The switching element SE1 can simultaneously have a damping or decoupling effect on the drive train and/or assemblies, e.g., by means of a spring damper element similar to a dual-mass flywheel. The switching element SE1 can also be integrated into, e.g., the interior of a gearwheel of the gear stage GR.

The illustration according to FIG. 4 illustrates the mode of operation of the drive arrangement in connection with selected vehicle operating states. The switching element SE1 is designed here such that it can provide three coupling functions S1, S2, S3. The first coupling function S1 enables a power transfer from the electric motor E to the axle differential AD. The second coupling function enables a power transfer from the electric motor E to the auxiliary unit AUX. The third coupling function enables a power transfer from the axle differential AD to the auxiliary unit AUX. The setting of the coupling functions S1, S2, S3 of the switching element SE in accordance with the different operating states of a motor vehicle are illustrated by tables T1 and T2. The specification "closed" means that torque is transmitted; the specification "open" means that no torque can be transmitted.

In the operating state 1 specified in table T1, the electric motor E is active and the switching element SE1 provides the coupling function S1, according to which the torque of the rotor shaft is fed to the axle differential via the reduction gear stage GR. If the auxiliary unit AUX1 is to be active in this state, the coupling functions S2 and/or S3 are also provided.

When the vehicle is in overrun mode in accordance with operating state 2 in table T1 and there is excess overrun power, the coupling function S1 and the coupling function S3 are set by the switching element SE1. A power conversion in recuperation operating mode now takes place via the electric motor E and, in addition, a mechanical drive of the auxiliary unit AUX takes place directly by tapping power from the axle differential AD.

In what is termed cruising operation, that is, the vehicle continues to run smoothly without any desired significant braking effect according to operating state 3 in table T1, the coupling functions S1, S2 are removed and only the coupling function S3 is activated. The auxiliary unit AUX is now driven directly by the axle differential AD without any electrical power consumption.

When the vehicle is stationary according to operating state 4 in table T1, the coupling functions S1 and S3 are deactivated and the auxiliary unit is driven directly by the electric motor E via the coupling function S2.

When the vehicle is stationary without the auxiliary unit AUX requiring action, for example when parking, the electric motor E is switched off. In this state, the switching element SE1 can assume any state since no specific coupling function is required in this state. However, it is also possible here to activate the coupling functions S1 and S3 in order to bring about a slightly increased holding torque, a braking effect in the event of unintentional rolling and, if necessary, an active braking effect by triggering the electric motor E.

The coupling functions S1, S2 can be implemented via a form-fitting coupling switching element or appropriately activatable clutches. The coupling function S3 can also be achieved by freewheeling and thus result automatically when the vehicle is in overrun mode.

The drive arrangement relates to a new type of connection of the auxiliary units. The connection of the auxiliary units in or to the transmission is achieved in connection with "intelligent" switching elements, which make it possible to always operate the auxiliary units in the most energy-efficient mode, depending on the operating state of the vehicle and/or the drive motor(s) and/or the battery charge state and/or external factors (e.g., temperature).

This is ensured by the auxiliary units being driven via the transmission shaft when the vehicle is moving. In particular, the kinetic energy of the vehicle can also be used. In addition, the mechanical drive generally has significant advantages in the overall efficiency chain, compared to purely electrified units. When the vehicle is stationary, the drive is electrical via a direct connection to the electric motor. The connection between the units and the transmission shaft is released, reducing friction losses. This mode of operation enables the provision of comfort functions, such as stationary air conditioning when the vehicle is stationary, or the safeguarding of necessary functions, such as operating the battery cooling circuit via a water pump for aftercooling after the vehicle has been stationary.

Figure 2:
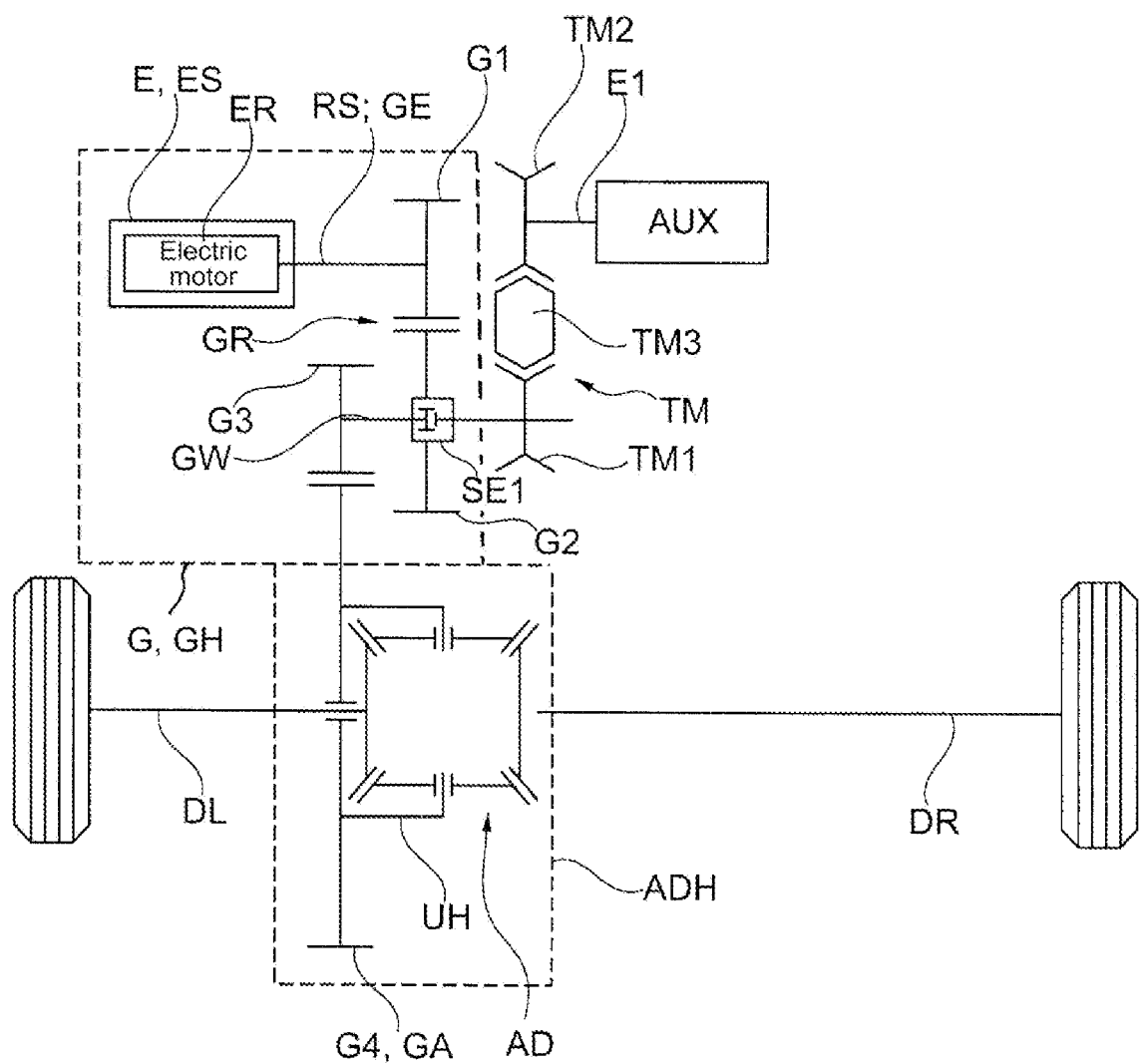
FIG. 2 shows a second schematic representation to illustrate the structure of an electromechanical drive arrangement, also having an auxiliary unit arranged outside the transmission housing, as well as a switching element provided for its selective coupling with the intermediate shaft of the reduction gear and the drive train portion leading to the axle differential and integrated into the transmission, wherein, however, the auxiliary unit here is arranged to be offset axially parallel with respect to the intermediate shaft.

The drive arrangement comprises a transmission which is connected to at least one electric drive motor on the input side, and to at least one vehicle axle on the output side. The transmission consists of a drive shaft, at least one intermediate shaft and one or more output shafts. The transmission can contain one or more planetary gear sets and/or spur gear stages. An auxiliary unit such as an air conditioning compressor, water pump, or the like is connected to the intermediate shaft coaxially and parallel thereto (FIG. 1). However, a connection is also possible, for example, by means of a belt or chain drive, wherein one of the drive wheels or one of the drive pulleys is connected coaxially and the traction mechanism drive is arranged to be axially parallel to the intermediate shaft (FIG. 2). If necessary, the chain or belt drives can be equipped with conventional guide and/or tensioning rails or deflection and/or tensioning rollers.

The connection of the unit to the intermediate shaft and the combination with a shift element described here has the advantage that the intermediate shaft can be designed as a complete and independent module and the design/construction of the remainder of the transmission is not affected by the connection of a unit. For example, retrofitting or merely optional equipment is possible. In addition, the speed of the intermediate shaft is lower than that of the electric motor or transmission input shaft so that the unit can be operated with less friction than when connected to the transmission input shaft. The electric machine and auxiliary unit(s) are connected here to the transmission housing from the outside, allowing for the use of proven components and facilitating maintenance and, if necessary, the replacement of these components.

The intermediate shaft is also equipped with a switching element, which makes it possible to decouple both the electric motor and the auxiliary unit, independently of one another or simultaneously, from the transmission and thus from the vehicle's drive train. However, even with complete decoupling from the drive train, there still exists a connection between the electric motor and auxiliary unit.

The switching element can be couplable or releasable either actively, e.g., as a magnetic clutch, or passively, e.g., as a freewheel. The switching element can contain constant or variable transmission/reduction stages, such as a planetary gear set. The switching element can simultaneously have a damping or decoupling effect on the drive train and/or assemblies, e.g., by means of a spring damper element similar to a DMF. The switching element can, for example, also be integrated in a gearwheel of the intermediate shaft. The switching states of the element corresponding to the different operating states are explained in more detail for one example in FIG. 4.

The coaxially connected auxiliary unit can also be connected to further auxiliary units, e.g., by means of a chain or toothed belt drive (FIG. 3). In this case, all connected auxiliary units can additionally have a further coupling and/or damping and/or decoupling element on their drive shaft. This enables individual operation of each individual unit, depending on the operating state of the vehicle and depending on the other elements. At the same time, the unit can be decoupled from torsional vibrations of the drive train, ensuring more uniform and efficient operation and/or avoiding possible adverse effects of the connection process on the drive train and thus indirectly on the vehicle.

The invention claimed is:

1. An electromechanical drive arrangement for a motor vehicle, the electromechanical drive arrangement comprising:
    an electromechanical main drive motor, comprising a rotor and a stator,
    a reduction gear device, comprising a transmission input, a transmission output, at least one reduction stage, and a transmission housing, accommodating the reduction stage,
    an axle differential for branching the drive power routed via the reduction stage (GR) to a first and a second wheel drive train portion, and
    an auxiliary unit that is drivable by the main drive motor via the reduction stage, wherein
    the auxiliary unit is arranged outside the transmission housing,
    a switching element is provided in the transmission housing, and
    the switching element is designed and integrated into the drive arrangement such that the drive connection from the reduction stage to the axle differential is switchably closable and switchably separable.

2. The drive arrangement according to claim 1, wherein integration of the switching element and the auxiliary unit into the drive arrangement is accomplished such that, when the drive connection between the axle differential and the reduction stage is removed and the motor vehicle is operated in overrun mode, the auxiliary unit is drivable by the axle differential.

3. The drive arrangement according to claim 1, wherein the integration of the switching element and the auxiliary unit into the drive arrangement is accomplished such that, when the drive connection between the axle differential and the reduction stage is removed and the motor vehicle is stationary, the auxiliary units is drivable by the main drive motor via the reduction stage.

4. The drive arrangement according to claim 1, wherein the reduction stage comprises an intermediate shaft.

5. The drive arrangement according to claim 4, wherein the reduction stage has a first gearwheel and a second gearwheel engaging therein, wherein the second gearwheel is arranged on the intermediate shaft and has a number of teeth which is greater than the number of teeth of the first gearwheel.

6. The drive arrangement according to claim 5, wherein the switching element switchably couples the intermediate shaft with the second gearwheel.

7. The drive arrangement according to claim 4, wherein the switching element switchably couples the intermediate shaft with an output gear seated thereon.

8. The drive arrangement according to claim 4, wherein the auxiliary unit has an input shaft arranged coaxially to the intermediate shaft.

9. The drive arrangement according to claim 4, wherein a first auxiliary unit and a second auxiliary unit are provided, wherein the first auxiliary unit has an input shaft which is arranged coaxially to the axis of the intermediate shaft, and that the second auxiliary unit has a second input shaft which is arranged to be offset parallel to the axis of the intermediate shaft.

10. The drive arrangement according to claim 1, wherein the auxiliary unit is integrated into the drive arrangement such that its input shaft faces the reduction stage.

11. The drive arrangement according to claim 4, wherein the auxiliary assembly has an input shaft arranged parallel to and offset from the intermediate shaft.

12. An electromechanical drive arrangement comprising:
    an electromechanical main drive motor having a rotor and a stator;
    a reduction transmission device having a transmission input driven by the rotor, a transmission output, at least one reduction stage and a transmission housing which accommodates the reduction stage;
    an axial differential transmission selectively driven by the transmission output and configured to split drive power between a first and a second wheel drive train section;
    an auxiliary assembly which is driven by the main drive motor via the reduction stage and which is arranged outside the transmission housing; and
    a switching element configured to selectively establish a drive connection between the reduction stage and the axial differential transmission.

13. The drive arrangement according to claim 12, wherein the switching element is further configured to establish a drive connection from the axial differential transmission to the auxiliary assembly while disconnecting the drive connection between the reduction stage and the axial differential transmission.

14. The drive arrangement according to claim 13, wherein the drive connection from the axial differential transmission to the auxiliary assembly is passively established during an overrun mode.

15. The drive arrangement according to claim 12, wherein the switching element is further configured to establish a drive connection from the reduction stage to the auxiliary assembly while disconnecting the drive connection between the reduction stage and the axial differential transmission.

16. The drive arrangement according to claim 12, wherein the reduction stage has a first gearwheel and a second gearwheel engaging therein, the second gearwheel being arranged on an intermediate shaft and having a number of teeth which is greater than the number of teeth of the first gearwheel.

17. The drive arrangement according to claim 16, wherein the switching element selectively couples the intermediate shaft to the second gearwheel.

18. The drive arrangement according to claim 16, wherein the switching element selectively couples the intermediate shaft with an output gearwheel seated thereon.

\* \* \* \* \*